United States Patent [19]
Hutchinson et al.

[11] Patent Number: 4,737,211
[45] Date of Patent: Apr. 12, 1988

[54] PROCESS FOR FABRICATION OF GRAPHITE/EPOXY TOOLS

[75] Inventors: John M. Hutchinson, Santa Clara; Harry M. Flynn, San Jose, both of Calif.

[73] Assignee: The United States of America as represented by the Secretary of the Navy, Washington, D.C.

[21] Appl. No.: 928,779

[22] Filed: Nov. 10, 1986

[51] Int. Cl.⁴ ............................................. B32B 31/22
[52] U.S. Cl. ................................... 156/154; 156/212; 156/280; 156/289; 264/225; 264/226; 264/257; 428/174; 428/408; 428/413
[58] Field of Search ............... 156/153, 154, 212, 280, 156/289; 264/219, 220, 225, 226, 227, 257; 428/174, 175, 408, 413

[56] References Cited

U.S. PATENT DOCUMENTS

| | | | |
|---|---|---|---|
| 4,080,416 | 3/1978 | Howard | 264/258 |
| 4,139,591 | 2/1979 | Jurisich | 264/257 |
| 4,272,309 | 6/1981 | Payne et al. | 264/225 X |
| 4,303,608 | 12/1981 | Ticker et al. | 264/225 X |
| 4,320,079 | 3/1982 | Minnear et al. | 264/225 X |
| 4,446,091 | 5/1984 | Pairaudeau et al. | 264/225 |

Primary Examiner—Robert A. Dawson
Attorney, Agent, or Firm—C. D. B. Curry; S. G. Precivale; K. S. Moss

[57] ABSTRACT

A process for fabricating graphite/epoxy tools where graphite/epoxy laminate is laid up on a mandrel to form an oversized shell which is subsequently machined to conform to the design dimensions.

3 Claims, 1 Drawing Sheet

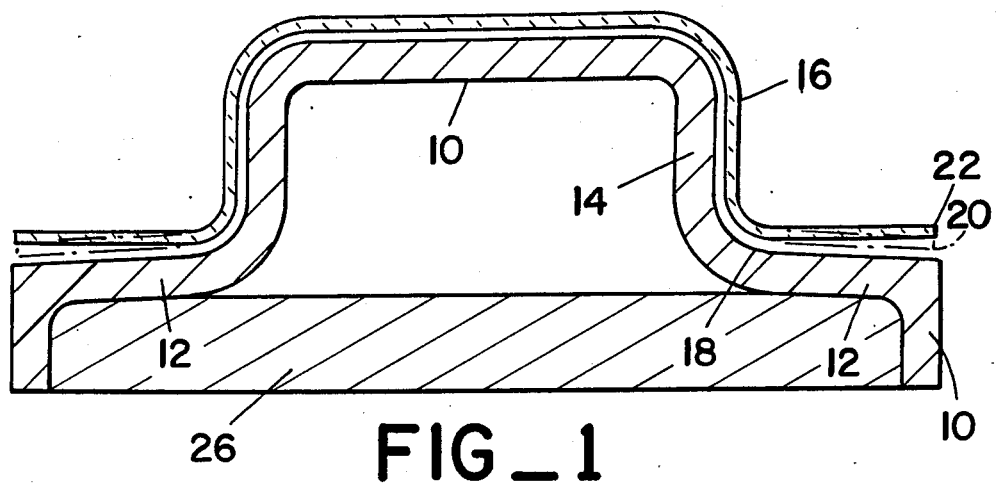
FIG_1
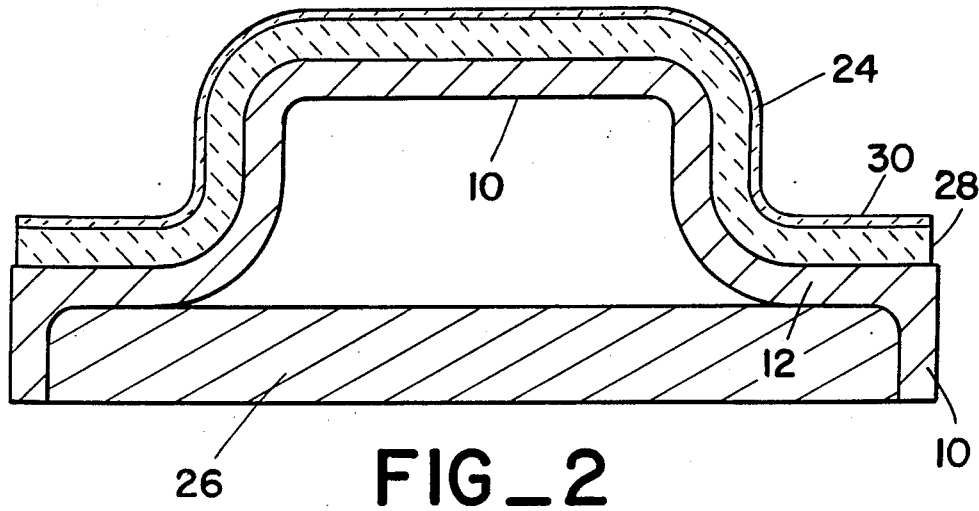
FIG_2
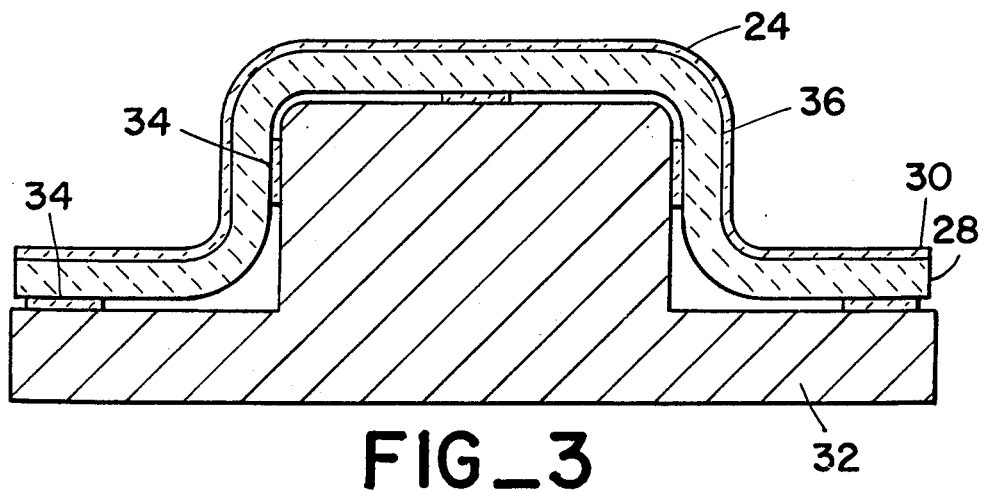
FIG_3

PROCESS FOR FABRICATION OF GRAPHITE/EPOXY TOOLS

BACKGROUND OF THE INVENTION

1. Field of the Invention

This invention relates to the fabrication of graphite/epoxy tools. More particularly, this invention relates to a process for fabricating graphite—epoxy tools having close tolerance features and excellent release properties. Still more particularly, but without limitation thereto, this invention releates to a process which produces high quality, dimensionally accurate tools which withstand heat, pressure and vacuum while providing excellent mold features.

2. Description of the Prior Art

Typically, graphite—epoxy tools are cast off a plaster or plastic surface. This method often exhibits problems with delamination and leakage due to moisture and/or air trapped in the tool laminate or facesheet during cure. Additionally, when a graphite/epoxy surface is cast and cured in this manner, irregularities such as warpage and distortion inevitably occur.

SUMMARY OF THE INVENTION

An object of the present invention is to develop a process for fabricating graphite/epoxy tools.

A further object of the present invention is to fabricate graphite/epoxy tools which do not exhibit leakage after a few cycles, distortion, warpage, delamination, or failure to hold engineering dimensions.

These and other objects have been demonstrated by the present invention wherein graphite/epoxy is laid up on a mandrel to form an oversized tool shell; the shell is cured, post cured and then machined to the desired size; and a resin coating is applied, cured and sanded to yield a dimensionally correct tool having a smooth, unblemished surface.

BRIEF DESCRIPTION OF THE DRAWING

The invention will be described in further detail with reference to the accompanying drawings wherein:

FIG. 1 is a cross-sectional view of the mandrel.

FIG. 2 is a cross-sectional view of the graphite/epoxy tool layup.

FIG. 3 is a cross-sectional view of the graphite/epoxy tool shell on a sub-assembly.

DESCRIPTION OF THE PREFERRED EMBODIMENT

In essence, the process disclosed herein works with the nature of the graphite/epoxy system instead of against it, in manufacturing graphite/epoxy tools. After the graphite/epoxy facesheet is cured to the approximate configuration, with excess layering, it is set on a sub-assembly in a relaxed condition. The sub-assembly is attached, the tool surface machined to nominal engineering dimensions then treated with heat resistant resin.

Machining or grinding the mold line guarantees contour control. Numerical control machining is prferred but conventional grinding and tracer grinding are also suitable techniques. Tolerances can be held much closer with machining than with splashing. Additionally, since the surface contour is created after completion of both the cure cycle and the graphite/epoxy reactions, the surface remains stable even after repeated cure cycles.

Preferably, a metal mandrel is used to cure and establish the basic shape of the tool. By using an inexpensive rough machined metal mandrel, maximum compaction for initial cure can be obtained while guaranteeing no leaks through the mandrel and no moisture in contact with the graphite/epoxy material.

This invention solves the problem of distortion by allowing for extra material at the onset. In this manner, there is sufficient material remaining so that all surfaces can be cleaned properly regardless of the degree of distortion.

When establishing the mandrel upon which the graphite/epoxy facesheet or shell will be cast, it is advantageous to use draft allowances on flanges where possible. This is best shown in FIG. 1, which illustrates a typical mandrel configuration suitable for use in this invention. Ordinarily, the flange is at a right angle with the mandrel's side. With this configuration the graphite/epoxy is likewise laid up at a right angle but as it cures it tends to spring back leaving a less than 90 degree angle. The mandrel 10 used by the present invention incorporates a spring back allowance to eliminate this problem. Instead of the flange being perpendicular to the side, in this invention the flange 12 is a few degress off, preferably 2-3 degrees, so that it forms a 92-93 degree angle with the side 14. In this manner, when the graphite/epoxy 16 is laid up upon surface 18 it will have a 92-93 degree angle before cure as indicated by the dotted line layup 20. Upon cure the graphite/epoxy 16 will spring back to the desired 90 degree angle as indicated by the solid line layup 22.

The method of layup of the graphite plies is done so as to allow for excess material thickness. This is illustrated in FIG. 2, wherein the oversized graphite/epoxy facesheet/shell 24 is laid up on a mandrel 10 which has been mounted to a plate 26 by means of welding or double back tape. The plate 26 provides a base for the graphite/epoxy tool to add stiffness and a perimeter surface for standard bagging. Layup of the oversized graphite/epoxy shell 24 is first done to form the design thickness layer 28 followed by laying up an extra allowance layer 30 for subsequent machining. Then the shell is cured.

Preferably, the fiber volume of the graphite/epoxy laminate is between 52 and 58 percent. When the laminate is too dry (high fiber volume) porosity could result if there is insufficient resin to saturate the fibers. If on the other hand, the laminate is too rich (low fiber volume, excess resin) then microcracks soon appear due to the resin dominant system.

A wide variety of tooling graphites are commercially available and selection will depend on tool application. The graphite must be thick enough to insure that: the finished graphite/epoxy tool will withstand 50 percent more pressure than would normally be applied to the tool in use; the finished tool must be rigid enough to withstand heat and maintain its shape; and there must be sufficient excess material for machining part surfaces to the design dimensions.

When the oversized shell 24 is cured, it is removed from the mandrel 10. The mandrel 10 and plate 26 have no further use after initial cure but should be retained if additional graphite/epoxy units are required. Post cure is performed with the shell 24 in a free standing, unrestrained condition. The duration of post cure necessary to stabilize the graphite/epoxy laminate depends upon the particular material selected.

FIG. 3 illustrates the sub-assembly used to support the oversized shell during machining. The sub-assembly 32 should be designed to match the type of tool being built. Since the process used in this invention does not induce any significant loads onto the oversized shell 24, the subassembly 32 need not be designed to resist great torsion or is it intended to pull a skin into position. Preferably, the graphite/epoxy shell 24 is attached to the sub-assembly 32 by means of graphite/epoxy strips, such as strip 34, cured in the oven or autoclave.

The oversized shell 24 is now ready for machining of the extra layup allowance 30, in order to attain the nominal mold line surface 36 which conforms to the design dimensions of the finished tool. Standard methods of machining and types of cutters are suitable.

After machining off layer 30, what remains is a graphite/epoxy tool having a single layer, design thickness layer 28. The exposed graphite at the nominal mold line surface 36 is porous and has a rough texture, which does not serve as a good mold surface. Therefore, at this stage the surface 26 is treated with a high temperature resin. The epoxy resin system utilized in the wet layups is also suitable for the surface treatment step.

The resin is applied to surface 36 with a flexible paddle then spread out evenly. When the resin has been allowed to penetrate the surface, any excess is scraped off. If too much resin is left on the graphite, it will have a tendency to puddle and run at the commencement of the cure cycle.

Once the resin is reduced to the thinnest possible layer, the graphite/epoxy tool, having design thickness 28, is placed in the oven and cured according to the requirements of the particular resin used, to create a hard, tenacious surface. An autoclave, or positive pressure is not necessary.

When the cure cycle is complete, the surface 36 is lightly sanded with fine grit sandpaper to remove any irregularities above the surface. At this stage in the process, the resin has sealed the surface and further provided wear resistance. In performing the sanding step, caution must be exercised so that the underlying graphite/epoxy layer 28 is not removed. This sanding step is solely intended to smooth off the resin film and remove any fibers, splinters or imperfections above surface 36.

After sanding, the surface 36 is wiped down to ensure that the tool is free of dust. Thereupon, another resin film is applied, cured and subsequently sanded down. These steps can be repeated as is deemed necessary, taking care not to build up too much resin. The presence of excess resin could result in cracking along with causing deviations from close tolerance dimensions.

When the desired surface is obtained, mold release is applied to surface 36 and the tool shell 24 having design thickness 28 remains on the sub-assembly 32. The application of mold release is a typical operation for any tool used to cure graphite/epoxy hardware.

The foregoing description has been set forth merely to illustrate the invention and is not intended to be limiting. Since modifications of the described embodiment incorporating the spirit and substance of the invention may occur to persons skilled in the art, the scope of the invention should be limited solely with respect to the appended claims and equivalents.

What is claimed is:

1. A process for fabricating graphite/epoxy tools comprising the steps of:
   (a) laying up graphite/epoxy laminate over a mandrel mounted on a plate to form an oversized shell having a design thickness layer and an extra allowance layer;
   (b) curing said oversized shell;
   (c) removing said oversized shell from said mandrel and said plate;
   (d) post curing said oversized shell;
   (e) supporting said oversized shell by means of a sub-assembly;
   (f) machining off said extra allowance layer on the surface which did not contact the mandrel to form a tool having said design thickness layer and a nominal mold line surface;
   (g) treating said nominal mold line surface with a high temperature resin;
   (h) lightly sanding said nominal mold line surface; and
   (i) applying mold release to said nominal mold line surface.

2. The process of claim 1 wherein said graphite/epoxy laminate has a fiber volume of about 52–58 percent.

3. The process of claim 1 wherein said mandrel has a flange and sides, said flange being at a 92–93 degree angle from said sides.

* * * * *